Aug. 19, 1924.

H. PODOLSKY 1,505,601

AUTOMOBILE SIGNAL

Filed Sept. 22, 1919

INVENTOR
Henry Podolsky
BY
Carlos P. Griffin
ATTORNEY.

Patented Aug. 19, 1924.

1,505,601

UNITED STATES PATENT OFFICE.

HENRY PODOLSKY, OF SAN FRANCISCO, CALIFORNIA.

AUTOMOBILE SIGNAL.

Application filed September 22, 1919. Serial No. 325,288.

*To all whom it may concern:*

Be it known that I, HENRY PODOLSKY, a citizen of the United States, residing at San Francisco, in the county of San Francisco, State of California, have invented a new and useful Automobile Signal, of which the following is a specification, in such full and clear terms as will enable those skilled in the art to construct and use the same.

This invention relates to an automobile signal and its object is to provide a day or night signal to indicate whether a car is to turn to the right or left and at the same time to provide a trouble lamp which may be removed from its ordinary position in the car and used wherever it may be desired.

Other objects of the invention will appear as the description proceeds.

An embodiment of the invention is shown in the drawings in which the same reference numeral is applied to the same portion throughout, but I am aware that there may be modifications thereof.

Figure 1:
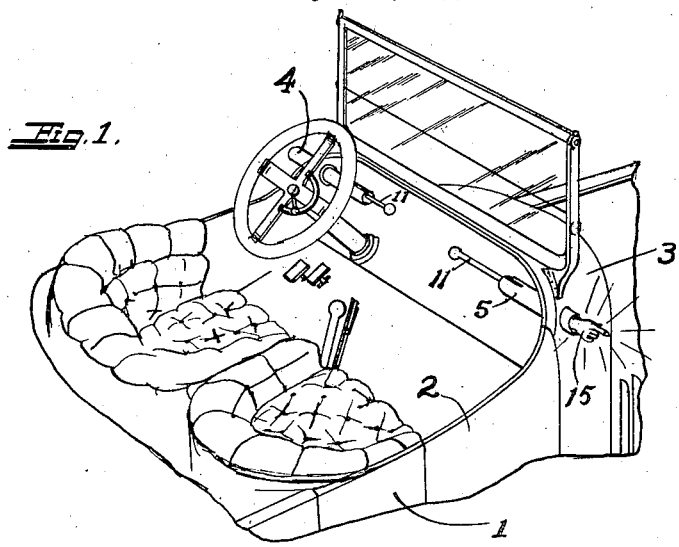
Fig. 1 is a perspective view of a portion of a car showing the lamp applied thereto.
Figure 2:
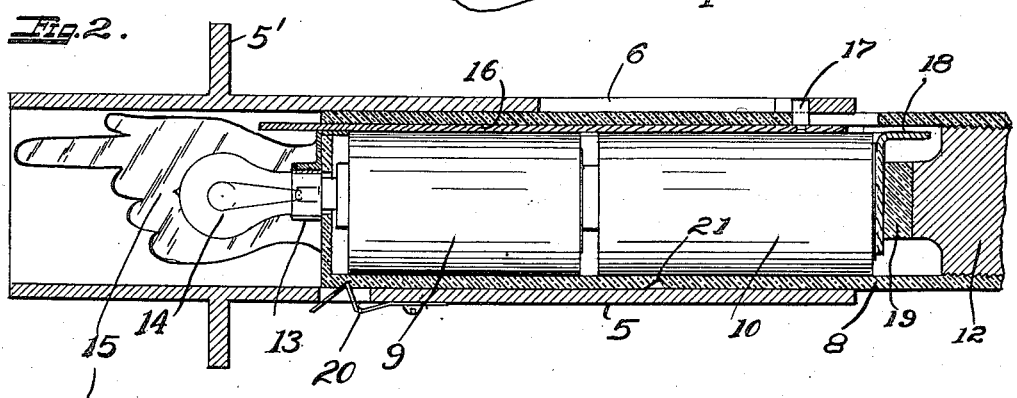
Fig. 2 is a sectional view of the tube which is secured to the car for carrying the signal and showing a portion of the signal tube.
Figure 3:
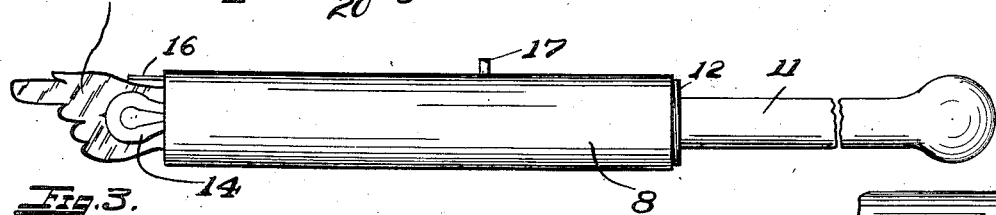
Fig. 3 is a view of the signal detached from the car tube.
Figure 4:
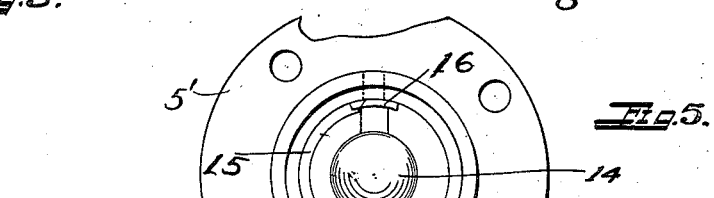
Fig. 4 is an end view of the car tube.
Figure 5:
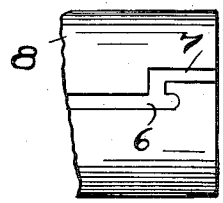
Fig. 5 is a plan view of a portion of the car tube showing the lock slot used for holding the lamp in the car tube.

The numeral 1 indicates the car body, 2 the side door and 3 the cowl dash board in which latter the signal tubes 4 and 5 are secured, one on one side of the car and the other on the opposite side of the car.

Each signal is identical with the other so only one will be described.

The tube 5 has a securing flange 5' and has a slot 6 therein which is offset as shown at 7 for the purpose of holding the lamp carrying tube 8 in place. The lamp carrying tube is of a suitable size to receive the dry batteries 9 and 10 and has a handle 11 with a threaded end 12 to close the tube 8 and hold the cells in place. At the opposite end of the tube 8 there is a socket 13 for a lamp 14 one contact of which bears on one contact of the battery 9 in a well known manner. The other contact of the lamp is made with the socket and the latter is in contact with a slidable plate 16 which has an operating pin 17 at one end. The other end of the plate comes in contact with a plate 18 secured to an insulated block 19 on the plug 12, said plate 18 contacting with the bottom of the cell 10 to complete the circuit.

On the lamp end of the tube 8 there is secured a hand 15 which is suitably colored and which is translucent enough for the light to show through to indicate to the approaching vehicle which direction the person operating the signal intends to turn.

In operation, the tube 8 is inserted in the tube 5 and the switch button is inserted in the slot 7 and then turned to a position in the slot 6 whereupon the spring 20 will engage a notch in the tube 8 and hold the lamp in position, another notch 21 being provided to hold the signal extended.

When the signal lamp 14 is pushed out the lug 17 contacts with the end of the slot 6 and since the lamp may be pushed out a little further the slide 16 is held until it contacts with the plate 18 thereby closing the circuit and lighting the lamp. When the lamp slide is pulled back the lamp will remain in circuit until the lug 17 strikes the opposite end of the slot 6 when the slide 16 will be stopped and further movement will disengage the plate 18 therefrom to break the battery circuit.

The ordinary form of zinc dry cells used in flash lights is used for the supply of the electric current. These cells are ordinarily made of a zinc cup covered with a suitable non-conductor and each cell has a carbon at the center with a projecting contact which touches the bottom of the next adjacent cell. In the present instance the arrangement is such that the bottom of the cell 9 contacts with the projecting contact on the top of the cell 10. The central contact of the cell 9 touches one of the contacts of the socket 13 holding the lamp 14, while the outer portion of said socket is connected with metallic parts of the apparatus which touch the slide 16, said slide operating within the insulated sleeve 8 and being in turn insulated by means of the covering of the cells 9 and 10 therefrom. At the bottom of the cell 10 it is connected with a plate 18 so that when the slide 8 is pushed forward the contact will be from the dry cells through the lamp and its filament through the metal parts of the apparatus to the slide 16, from the slide 16 to the metal parts of the apparatus at 18 and back to the bottom of the cell 10.

The dry cells are ordinarily covered with paper which insulates them from the slide 16.

What I claim is as follows, but various modifications may be made in the construction shown in the drawings and above particularly described form, within the purview of my invention.

A signal lamp for automobiles comprising a tube having means to attach it to an automobile body, a second tube within the first tube having a shorter slot than the first tube, a signal at one end of the latter tube, a latch to hold the second tube extended or retracted as desired, batteries carried within the second tube, a lamp carried by said second tube, a slidable switch within the second tube, an operating knob on the switch projecting through the slots in the first tube and second tube to close said switch when the signal is extended, and a handle connected to the second tube and projecting from the first tube for the operation of the signal.

In testimony whereof I have hereunto set my hand this 13th day of September A. D. 1919.

HENRY PODOLSKY.